(12) United States Patent
Petranovich et al.

(10) Patent No.: US 7,830,907 B1
(45) Date of Patent: Nov. 9, 2010

(54) FRAME STRUCTURE FOR OFDM SIGNALING, INCLUDING BEACONS AND TRAFFIC

(75) Inventors: James E. Petranovich, San Diego, CA (US); Steven H. Gardner, San Diego, CA (US); Neal Riedel, Carlsbad, CA (US); Deepak Ayyagari, Vancouver, WA (US); Daniel Park, Beaverton, OR (US); Garold B Gaskill, Camas, WA (US)

(73) Assignee: Coppergate Communications Ltd., Tel Aviv (IL)

( * ) Notice: Subject to any disclaimer, the term of this patent is extended or adjusted under 35 U.S.C. 154(b) by 845 days.

(21) Appl. No.: 10/950,262

(22) Filed: Sep. 24, 2004

Related U.S. Application Data (60) Provisional application No. 60/506,662, filed on Sep. 26, 2003.

(51) Int. Cl.
*H04J 4/00* (2006.01)
(52) U.S. Cl. .................. 370/436; 370/432; 370/442; 370/445
(58) Field of Classification Search .......... 370/208, 370/328, 338, 431–433, 436, 442, 445, 447, 370/462
See application file for complete search history.

(56) References Cited

U.S. PATENT DOCUMENTS

| | | | | |
|---|---|---|---|---|
| 6,836,469 | B1* | 12/2004 | Wu | 370/322 |
| 6,845,106 | B2* | 1/2005 | McKinnon et al. | 370/477 |
| 7,042,897 | B1* | 5/2006 | Sivaprakasam et al. | 370/462 |
| 7,127,254 | B2* | 10/2006 | Shvodian et al. | 455/450 |
| 7,280,465 | B2* | 10/2007 | Mestdagh | 370/206 |
| 2002/0010870 | A1* | 1/2002 | Gardner | 713/300 |

* cited by examiner

*Primary Examiner*—Huy D Vu
*Assistant Examiner*—Dady Chery
(74) *Attorney, Agent, or Firm*—AlphaPatent Associates Ltd.; Daniel J. Swirsky (57) ABSTRACT

Provided is a frame structure for filtered OFDM signaling, wherein once every frame a central controller passes redundant broadcast data for a short time (e.g. 16 symbol times) over all frequencies in use. This broadcast, called a beacon, may carry control information, frame structure information, and other data. The rest of the frame is divided into other assignments, including broadband redundantly coded channels for broadcast, ALOHA contention access, or point-to-point transmissions, and including traffic channels that may use only some of the assigned frequencies intended primarily for point-to-point access. This allows a mix of TDMA and FDMA point-to-point and broadband access. This system may be controlled by a central coordinator, which issues reservations. This system allows devices on a frequency-selective channel to communicate with scheduled operations.

16 Claims, 7 Drawing Sheets

| Attribute | Beacon (BePCh) | Contention (CoPCh) | Broadcast (BrPCh) | Traffic (Bearer) |
|---|---|---|---|---|
| Tones Used | All | All | All | Allocated |
| Guard Bands (Tones) | N/A | N/A | N/A | 1 |
| Time Slots Used (S) | 1 | Configurable | Configurable | Allocated |
| Guard Intervals in Slots | 0/1 | 0/1 | 0/1 | 0/1 |
| Who can transmit | Central: CCo Proxy: PLN, not CCo not NCo Neighbor: NCo Discover: Any | PLN, not CCo | PLN or CCo | PLN or CCo |
| Who can receive | All | All | All | Intended receiver |
| Access Method | Central: Exclusive to CCo. Neighbor: Exclusive to NCo. Proxy and Discover: Allocated. | Slotted ALOHA | Allocated | Allocated |
| Modulation | 8DPSK | 8DPSK | 8DPSK | Allocated (QAM, DPSK or DAPSK) |
| Coding Type | Shortened RS+ Repetition (18) | Shortened RS + Repetition (18/N) | Shortened RS + Repetition (18/N) | Coherent QAM: Concatenated (Trellis+RS) Others: Shortened RS |
| Coding Rate | 1/30 | Configurable N/30 | Configurable N/30 | Allocated |
| Length of Preamble (OFDM Symbols) | 2 | 2 | 2 | 2 |
| Data Payload Size (bytes) | 99 | [99+123(S-1)]* N | [99+123(S-1)]* N | Allocated |
| Control or Application Data | Control only | Control only | Both | Both |

Fig. 6

| ID Type (b15-b12) | ID Value (b11-b0) | Logical Channels | Description |
|---|---|---|---|
| 2 | 0x000-0xFFF | DCLChs | 0x000: Reserved for use by PLNs prior to Association.<br>0xFFF: Reserved for use by PLNs to broadcast control messages.<br>0x001-0xFFE: DCLCh IDs assigned to PLN by CCo |
| 3 | 0x000-0xFFF | DDLChs | 0x000: Reserved<br>0x001-0xFFF: DDLCh IDs assigned to CCo by PLN during Connection Establishment |

Fig. 7

FRAME STRUCTURE FOR OFDM SIGNALING, INCLUDING BEACONS AND TRAFFIC

RELATED APPLICATIONS

This application claims priority from U.S. Provisional Application No. 60/506,662, filed on Sep. 26, 2003, herein incorporated by reference. The following U.S. Patent Applications are also incorporated by reference in their entireties and made part of the present application:

U.S. patent application Ser. No. 10/949,861, titled "Circular Constellations with Coherent Gain/Differential Phase and Pilots," filed concurrently with the present application;

U.S. patent application Ser. No. 10/950,261, titled "MAC Structure with Packet-Quasi-Static Blocks and ARQ," filed concurrently with the present application;

U.S. patent application Ser. No. 10/950,063, titled "Broadcast with Redundant Coding," filed concurrently with the present application; and U.S. patent application Ser. No. 60/506,622, titled "Channel Sounding and Channel Analysis," filed concurrently with the present application.

BACKGROUND OF THE INVENTION

1. Field of the Invention

The present invention relates generally to communication over Ethernet-Class network and, more specifically to encoding methods for robust communication over noisy communications media.

2. Background

For transmission of digital signals some form of modulation is necessary to convert bit streams into an electrical waveform suitable for transmission over a communication channel. Modulation is used to minimize the effects of noise, match the frequency spectrum of the transmitted signal with channel characteristics and overcome some equipment limitations.

Modulation means to vary or change. To communicate a data signal over a communication channel, the data signal is impressed upon a constant wave called a carrier by varying or modulating this radio wave or carrier. Different modulation techniques, such as Amplitude Modulation (AM), Frequency Modulation (FM), Pulse Code Modulation (PCM) and so on, represent different ways to shape or form carrier waves.

Some simple and basic modulation techniques include Amplitude Shift Keying (ASK), Phase Shift Keying (PSK) and Frequency Shift Keying (FSK). Amplitude modulation represents the bits of information by changing a continuous carrier tone, where a continuous carrier is used to represent a zero, and a modulated signal is used to represent a one. In PSK modulation, the phase is shifted for the two different states. The major difference between ASK and PSK modulation schemes is that ASK is a linear modulation scheme, whereas PSK is a nonlinear scheme. FSK, on the other hand, consists of shifting the frequency of a sinusoidal carrier from a mark frequency to a space frequency. FSK is identical to modulating an FM carrier with a binary digital signal. FSK is the least susceptible to distortions during transmission. Because there are many different frequencies that could be chosen, there are many variations of FSK modulation, which can be defined by modulation indices.

Today, digital multimedia applications create an ever-increasing demand for broadband communication systems. Although the technical requirements for related products are quite high, the solutions must remain affordable to implement for consumer products. Orthogonal Frequency Division Multiplexing (OFDM) is a method that allows transmission of high data rates over extremely hostile channels at a comparable low complexity. OFDM has been chosen as the transmission method for the European radio (DAB) and TV (DVB-T) standard.

In OFDM, the subcarrier pulse that is used for transmission is rectangular. This has the advantage that the task of pulse forming and modulation can be performed by a simple Inverse Discrete Fourier Transform (IDFT), which can be implemented as an I Fast Fourier Transform (IFFT). Accordingly, in the receiver, an FFT can reverse this operation. According to the theorems of the Fourier Transform, the rectangular pulse shape will lead to a sin (x)/x type of spectrum of the subcarriers. The reason why the information transmitted over the carriers can still be separated is the so-called orthogonality relation giving the method its name. By using an IFFT for modulation, the spacing of the subcarriers is chosen in such a way that at the frequency where the received signal is evaluated, all other signals are zero. In order for the orthogonality to be preserved, the receiver and the transmitter must be perfectly synchronized. In other words, the receiver and the transmitter must both assume exactly the same modulation frequency and the same time-scale for transmission.

The OFDM symbols can be artificially prolonged by periodically repeating the tail of the symbol and precede the symbol with it. At the receiver this so-called guard interval is removed again. As long as the length of this interval is longer than the maximum channel delay all reflections of previous symbols are removed and the orthogonality is preserved. Accordingly, the OFDM transmission over a multipath channel can be achieved, since the transmitted symbols at a given time-slot and a given subcarrier are only disturbed by a factor which is the channel transfer function at the subcarrier frequency, and by additional white Gaussian noise.

However, despite of OFDM's provision of high data rates over extremely hostile channels, there still remains a strong need in the art to improve the existing frame structures for OFDM based signaling for data transmission over noisy communication channels, such as powerlines, and to enable, for example, a mix of TDMA and FDMA point-to-point and broadband access.

SUMMARY OF THE INVENTION

The present invention provides a frame structure for filtered OFDM signaling, wherein once every frame a central controller passes redundant broadcast data for a short time (e.g. 16 symbol times) over all frequencies in use. This broadcast, called a beacon, may carry control information, frame structure information, and other data.

In one or more embodiments, the beacon occupies one slot and delineates the beginning of a frame. (Note that the beacon may occupy more than one slot if necessary to provide full media coordination information). The rest of the frame is divided into other assignments, including broadband redundantly coded channels for broadcast, ALOHA contention access, or point-to-point transmissions. The frame may also include traffic channels that may encompass only some of the assigned frequencies intended primarily for point-to-point access. This allows a mix of TDMA and FDMA point-to-point and broadband access.

In one or more embodiments, a central coordinator manages the system by reserving communication channels for devices on the network. Thus allowing devices on a frequency-selective channel to communicate with scheduled operations. Each device on the network may act as the central coordinator. Also, multiple networks may exist on the same media in which case a device in each network acts as the central coordinator of that network. Each frame thus includes the sub-frames of the individual networks (with the exception of Proxy Networks).

DETAILED DESCRIPTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, transmitters, receivers, tone detectors, tone generators, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

Furthermore, it should be appreciated that the particular implementations shown and described herein are merely exemplary and are not intended to limit the scope of the present invention in any way.

Overview of Powerline Technology

Powerline technology delivers a next generation home-networking capability that delivers high-rate, high-quality multiple simultaneous home entertainment streams and other digital content throughout the home using the powerline channel.

Figure 1:
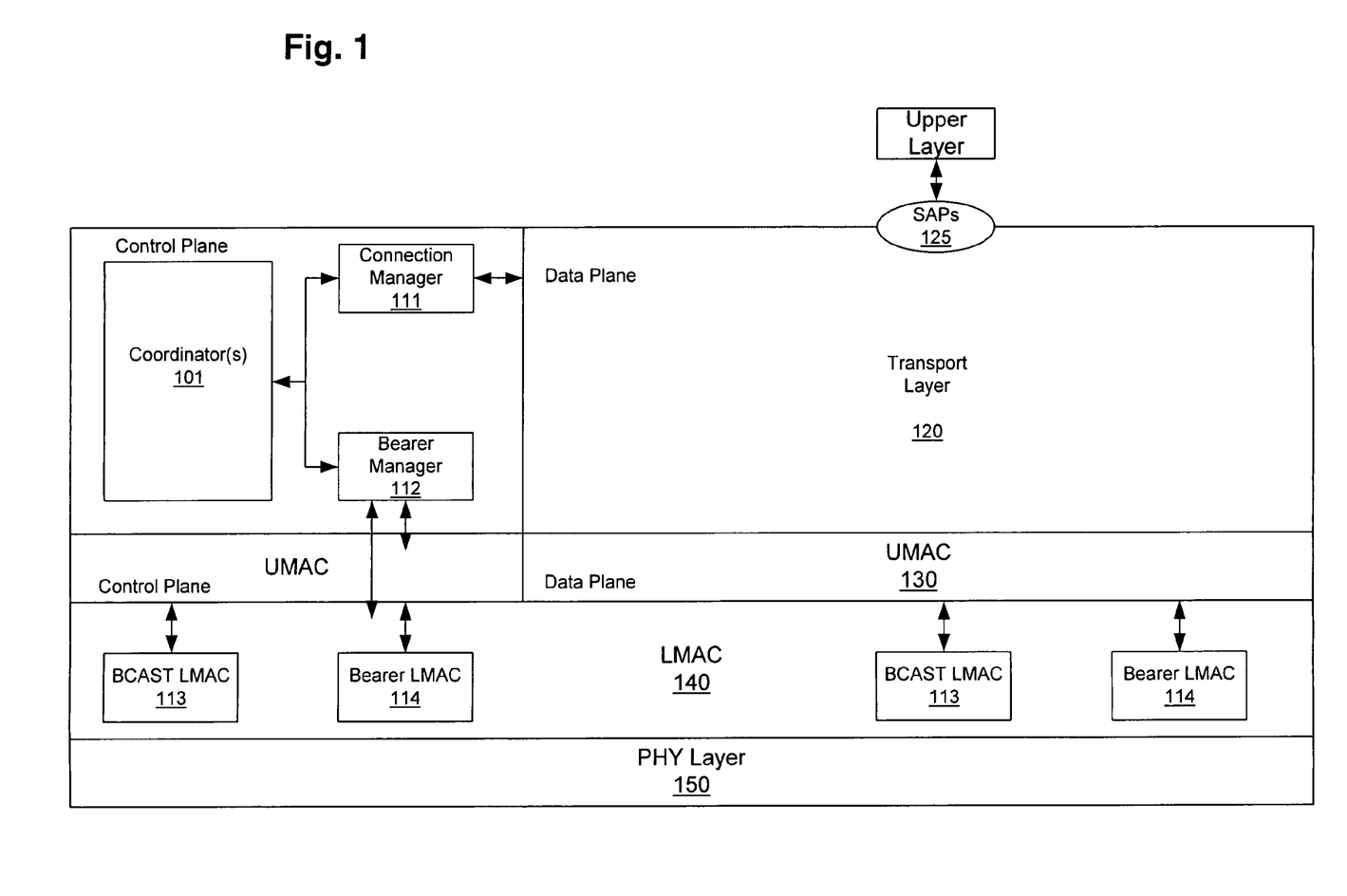
FIG. 1 is an illustration of protocol layers of a powerline network communication system or device, in accordance with an embodiment of the present invention.

FIG. 1 is an illustration of protocol layers of a powerline network communication system or device. As illustrated, a powerline network (PLN) device may be partitioned into four distinct layers based on functionality: the PHY 150, the Lower MAC (LMAC) 140, the Upper MAC (UMAC) 130 and the Transport Layer 120. In addition, there are three management entities called the Connection Manager (CM) 111, the Bearer Manager (BM) 112 and the Coordinator(s) 101. Each coordinator(s) 101 has functions based on the type of network. A PLN system supports a mix of audio, video, and IP applications. Use of Universal Plug and Play (UPnP) may also be employed for service discovery.

Transport Layer 120 roughly aligns with the standard ISO definition for Transport Layer in the OSI model. Transport Layer 120 provides convergence services between other protocols, which may be defined at lower layers of the OSI model, and the device's protocol stack. The Transport Layer can support various applications and protocols. The convergence functions of the Transport Layer include the definition of specific Service Access Points (SAPs) between the Application and the Transport Layer and functions such as Classification engines in the Transport Layer for each SAP 125. The Transport Layer also provides QoS support functions such as QoS specification of traffic flows (called Connections), QoS monitoring and control.

The Upper MAC (UMAC) layer 130 performs framing and multiplexing of application flows and control information flows, and maintains the mapping of Physical Channels to the corresponding flows.

The Lower MAC (LMAC) 140 performs Reed-Solomon Forward Error Correction (FEC) and Automatic Repeat reQuest (ARQ) and interleaves and scrambles the data on individual Physical Channels. The Lower MAC 140 includes communication channels Broadcast (BCAST) LMAC 113 and Bearer LMAC 114.

Communication on the Physical Layer (PHY) 150 is based on Orthogonal Frequency Division Multiplexing (OFDM). The PHY maps the data received from the LMAC into OFDM Symbols and modulates it onto the powerline wiring at frequencies (Tones) and time slots (Slots) allocated to the Physical Channel. (A tone is the smallest frequency unit that can carry modulated data. The frequency of Tone k is k times base frequency. In one embodiment, the base frequency is 39.0625 KHz and k ranges from 103 to 716) thus providing a communication range of 4-28 MHz.

The PHY 150 uses a variant of orthogonal frequency division multiplexing (OFDM) as the basic transmission technique. OFDM is well known in the arts. It is currently widely used in DSL technology and also in terrestrial wireless distribution of television signals. In contrast to these technologies, however, the powerline technology uses OFDM in a burst mode rather than in continuous mode. Powerline technology also uses concatenated Viterbi and Reed Solomon (RS) FEC with interleaving for payload data, and turbo product coding (TPC) for sensitive control data fields.

OFDM divides the high-speed data stream to be transmitted into multiple parallel bit streams, each of which has a relatively low bit rate. Each bit stream then modulates one of a series of closely spaced carriers. The property of orthogonality is a result of choosing the carrier spacing equal to the inverse of the bit rate on each carrier. The practical consequence of orthogonality is that if a Fast Fourier transform (FFT) of the received waveform is performed over a time span equal to the bit rate on an individual carrier, the value of each point in the FFT output is a function only of the bit (or bits) that modulated the corresponding carrier, and is not impacted by the data modulating any other carrier.

When the carrier spacing is low enough that the channel response is relatively constant across the band occupied by the carrier, channel equalization becomes easy. Implemented in the frequency domain, equalization can be achieved by a simple weighting of the symbol recovered from each carrier by a complex valued constant. Many different types of modulation can be used on the individual carriers.

The need for equalization however is completely eliminated by using differential phase shift keying (DPSK) modulation. DPSK modulation is where the data is encoded as the difference in phase between the present and previous symbol in time on the same subcarrier. Differential modulation improves performance in environments where rapid changes in phase are possible.

The MAC protocol in the powerline technology is a variant of the well-known time division multiple access (TDMA) protocol. The MAC Protocol may uses frequency division multiple access (FDMA) protocol as well as TDMA. The use of TDMA means the PHY must support burst transmission and reception; that is, each client enables its transmitter only when it is scheduled to send and, upon finishing, turns off its transmitter and returns to the receive mode. The TDMA and FDMA schedules are maintained by the coordinator(s) 101 of the system.

The PHY uses adaptive modulation methods for each Tone to provide a modulation density from 1 to 10 bits per Simple Symbol. This allows the PHY to dynamically adapt to Channel conditions on a Tone-by-Tone basis thus optimizing throughput.

An embodiment of the present invention defines a Frame that is comprised of Slots and Tones. Each Slot consists of a fixed number of OFDM Symbols. Communication between PLNs occurs in a channel that comprises one or more Slot-Tone Sets (a.k.a. Bursts). The precise mapping of Slot-Tone Sets defining a channel is controlled by the coordinator(s) 101. These mappings may be made known to the PLNs involved either by an allocation when negotiating the communication parameters for the physical channel or at the beginning of each frame by the central coordinator of the network.

At the beginning of each Frame the coordinator broadcasts a Beacon Message that assigns Physical Channels for the Frame. All Slots not assigned to the physical channels may be reserved. Possible uses determined by the coordinator(s) 101 for these reserved Slots include: Bearers (on which the appropriate PLNs will transmit), silence (for sounding measurements), Sub-Frames for the use of Neighboring powerline networks, or for coexistence with prior art powerline networks.

Figure 2:
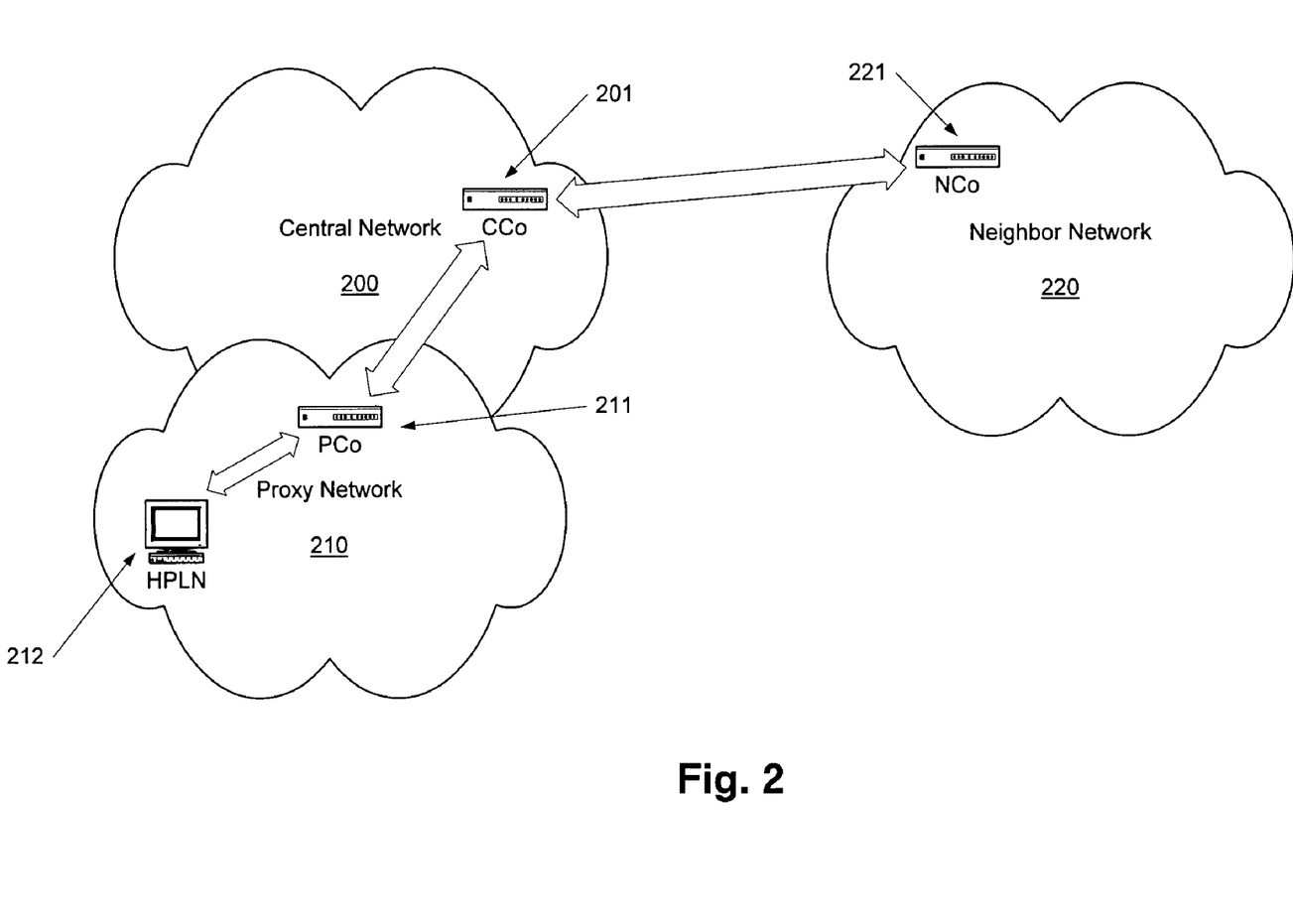
FIG. 2 is an illustration of how multiple powerline networks may exist on the same power line medium.

Neighboring powerline networks may exist, for instance, if users in two neighboring dwellings which share a power line wish to use the powerline communication network. FIG. 2 is an illustration of how multiple powerline networks may exist on the same power line medium. Such networks are called Neighbor Networks. In such a case, in one example embodiment, a network that has been in existence the longest may become the Central Network (i.e. 200) and a newer network may become the Neighbor Network (i.e. 220). Framing will come from the CCo 201 of the central network, which will allocate a contiguous portion of the Frame to the Neighbor Network. The NCo 220 will control the allocation of the Sub-Frame to the PLNs in the Neighbor Network.

The illustration of FIG. 2 also shows how a proxy network may exist within a powerline network. The creation of a proxy network may occur when a PLN (e.g HPLN 212) is not able to communicate directly with the Coordinator (e.g. CCo 201) of the network to which it logically belongs (e.g. the central or neighbor network). If the PLN (e.g. 212) can communicate with any other PLN (e.g. 211) in the network, PLN 211 becomes the proxy PLN and will communicate the Hidden PLN's (HPLN 212) existence to the CCo 201 (or NCo), which will in turn set up a Proxy Network that will permit HPLN 212 to participate in the network. PLN 211 becomes the Proxy Network Coordinator (PCo 211) and CCo 201 will communicate via PCo 211 which will relay CCo commands to HPLN 212. Note that NCo 221 is the central coordinator of the neighbor network to all PLNs within the neighbor network.

Example Embodiments

Embodiments of the present invention provide a frame structure conducive to a mix of signaling techniques. For instance, one embodiment uses filtered Multi-Tone Modulation with methods that support the use of Time Division Multiplexing (TDM), Frequency Division Multiplexing (FDM), or both. The modulation is a variant of OFDM in which individual Tones (or carriers) have tight spectral containment filtering. (As used herein, a Tone is the basic unit of frequency assignment.)

Filtering of each transmitted tone may be accomplished using a square root of raised cosine (RRC) filter, for instance. The filter may be implemented in many different ways, but the desired filter behavior should be functionally equivalent to a design that implements a baseband RRC filter for each Tone operating on the Symbol constellation points before the Tone is modulated onto the carrier.

As used herein, a Frame is the basic time interval over which the media is scheduled and shared. Typical traffic assignments will repeat every Frame time. A Frame consists of a number of Symbols, n, e.g., n=4096. Each Frame has a time duration, e.g., 131.072 milliseconds in one embodiment (each symbol time is 32 microseconds).

As used herein, a Slot is the basic unit of time assignment. All assignments are in an integral number of Slots. In one embodiment, a Slot consists of a number of Symbol times, m, e.g., m=16. Thus, there are n/m slots per frame. Using the example numbers for slots of 16 symbol times and for frame of 4096 symbol times, there are 256 time Slots per Frame. Thus the duration of a Slot is approximately 512 microseconds. It should be apparent to those of skill in the arts that the number of symbol times for slots and frames are not limited to 16 and 4096, respectively. Other applications may choose other symbol values for slot and/or frame definition.

In one or more embodiments, traffic within each frame may be controlled by a central coordinator (CCo) thus allowing devices on a frequency-selective channel to communicate with scheduled operations. For instance, once every frame a central controller may broadcast redundant data over all frequencies in use for a short time (e.g. over one slot). This broadcast, herein called a beacon, may carry control information, frame structure information, and other data. The rest of the frame may be divided into other assignments, including broadband redundantly coded channels for broadcast, ALOHA contention access, or point-to-point transmissions, and including traffic channels that may use only some of the assigned frequencies intended primarily for point-to-point access.

Figure 3:
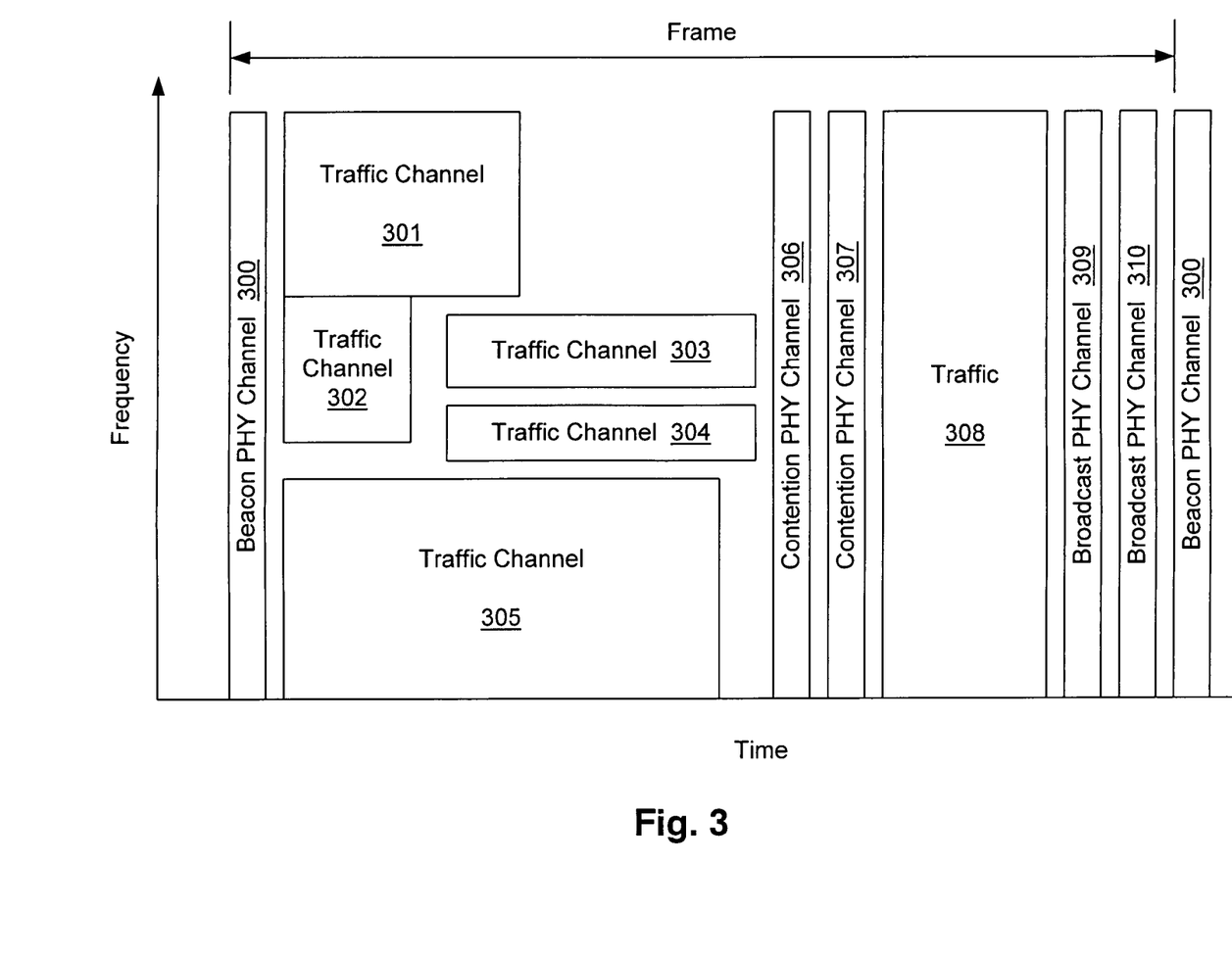
FIG. 3 is an illustration of a sample frame format for a single network in accordance with an embodiment of the present invention.

FIG. 3 is an illustration of a sample frame format for a single network in accordance with an embodiment of the present invention. As illustrated, each frame begins with a Beacon PHY Channel (e.g. 300), followed by a number of traffic channels (e.g. 301, 302, 303, 304, and 305), followed by one or more contention PHY Channels (e.g., 306 and 307), Traffic 308, and one or more Broadcast PHY Channels (e.g., 309 and 310). As discussed above, Beacon PHY Channel 300 delineates the beginning of a new frame.

In embodiments where there are multiple networks, the Frame, which is instantiated by the coordinator of the Central Network (CCo) is divided into Sub-Frames. PLNs belonging to a particular network may only communicate within the Sub-Frame assigned to that network. The Frame is delineated by the Central Beacon transmitted by the CCo. The Sub-Frames within a Frame are delineated by the transmission of a Neighbor Beacon at the beginning of the Sub-Frame. Each Beacon includes parameters that delineate the boundaries of the Sub-Frame.

Proxy Networks do not have dedicated Sub-Frames. Hidden PLNs and Proxy Coordinators (PCos) share the same Frame or Sub-Frame as the network they are associated with.

Figure 4:
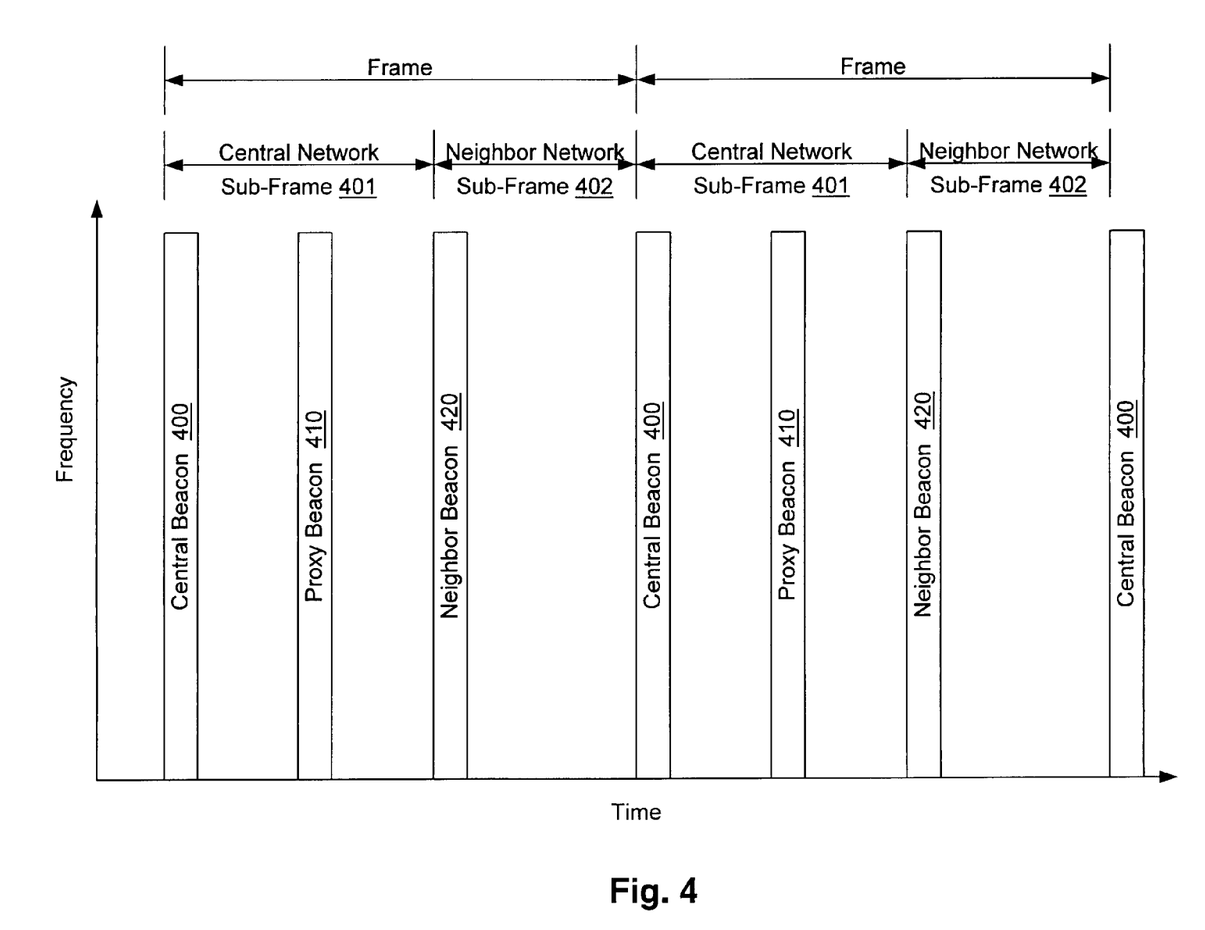
FIG. 4 is an illustration of Sub-Frames in a system having multiple networks.

FIG. 4 is an illustration of Sub-Frames in a system having multiple networks. The Neighbor Beacon 420 demarcates the Sub-Frame 402 within the Frame that is used by the Neighbor Network. The Central Beacon 400 indicates the Sub-Frame 401 used by the Central Network. In this illustration, Proxy Beacons (e.g. 410) do not define new Sub-Frames, but indicate the Sub-Frame of the network they are associated with. For instance, Proxy Beacon 410 is associated with Sub-Frame 401 of the Central Network.

As previously illustrated in FIG. 3, embodiments of the present invention divide the frame into a set of channels for communication. These channels, categorized as physical and logical channels are used to carry information between devices on the network.

Figure 5:
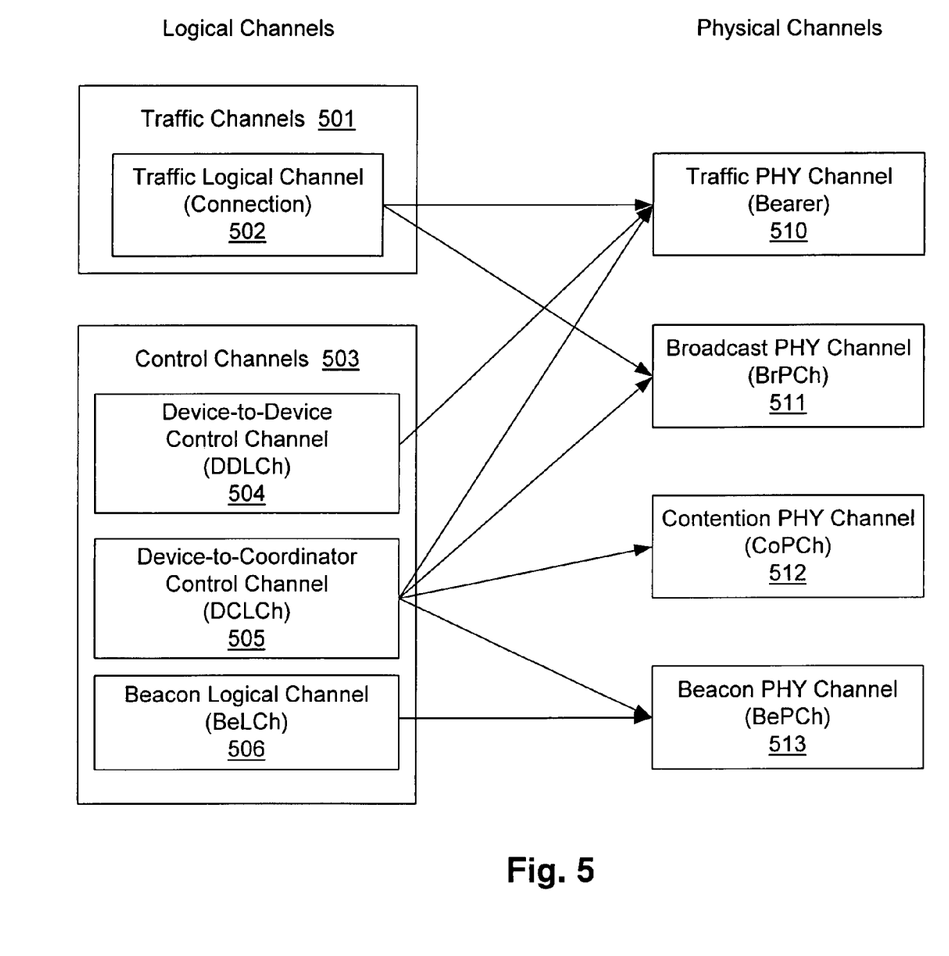
FIG. 5 is an illustration of the relationship between physical and logical channels, in accordance with an embodiment of the present invention.

FIG. 5 is an illustration of the relationship between physical and logical channels, in accordance with an embodiment of the present invention. This illustration shows that there are four types of physical channels: Beacon (BePCh) 513, Contention (CoPCh) 512, Traffic (TrPCh) 510 and Broadcast (BrPCh) 511. Traffic channels may use a subset of the Tones in the Tone Mask that is negotiated with the Central Coordinator (CCo) based on the quality of the channel between the transmitter and the intended receiver. This subset of Tones is called the Tone Map. The modulations used for any Tone in the Tone Map can be chosen independently of the modulations used by any other Tone from the complete set of available modulations used for communication, e.g., QAM, DPSK, DAPSK, etc. All other channel types use all the Tones in the Tone Mask, and they use specific modulation and coding scheme such as 8DPSK, for example.

As illustrated, some embodiments carry the logical channels on different physical channels. For instance, Traffic Logical Channel (Connection) 502 may be carried in Traffic PHY Channel (Bearer) 510 and Broadcast PHY Channel (BrPCh) 511. Also, Device-to-Device Control Channel (DDLCh) 504 may be carried in Bearer 510. Also, Device-to-Coordinator Control Channel (DCLCh) 505 may be carried on all the physical channels, e.g., Bearer 510, Broadcast PHY Channel (BrPCh) 511, Contention PHY Channel (CoPCh) 512, and Beacon PHY Channel (BePCh) 513. Finally, Beacon Logical Channel (BeLCh) 506 may be carried Beacon PHY Channel (BePCh) 513.

The Physical Channels (PCh), i.e., Traffic PHY Channel (Bearer) 510; Broadcast PHY Channel (BrPCh) 511; Contention PHY Channel (CoPCh) 512; and Beacon PHY Channel (BePCh) 513, specify the Tone/Slot Allocations and all modulation parameters required for communication of bits at the PHY layer between two PLNs or between a PLN and a Coordinator. Logical Channels (LChs) carry control information and application data between peer protocol layers in the PLNs or the Coordinator. Logical Channels are further classified as Control Channels 503 and Traffic Channels 501. Traffic Channel 501 comprises Traffic Logical Channel 502. Control channel 503 (also Control Logical Channel) comprises Device-to-Device Control Channel (DDLCh) 504, Device-to-Coordinator Control Channel (DCLCh) 505, and Beacon Logical Channel (BeLCh) 506. Control Logical Channels 503 carry control information (also MEntries) between peer control entities such as the Bearer Manager (BM), Connection Manager (CM) or the Coordinators. The Traffic Logical Channels (Connections) 502 carry application data.

Figure 6:
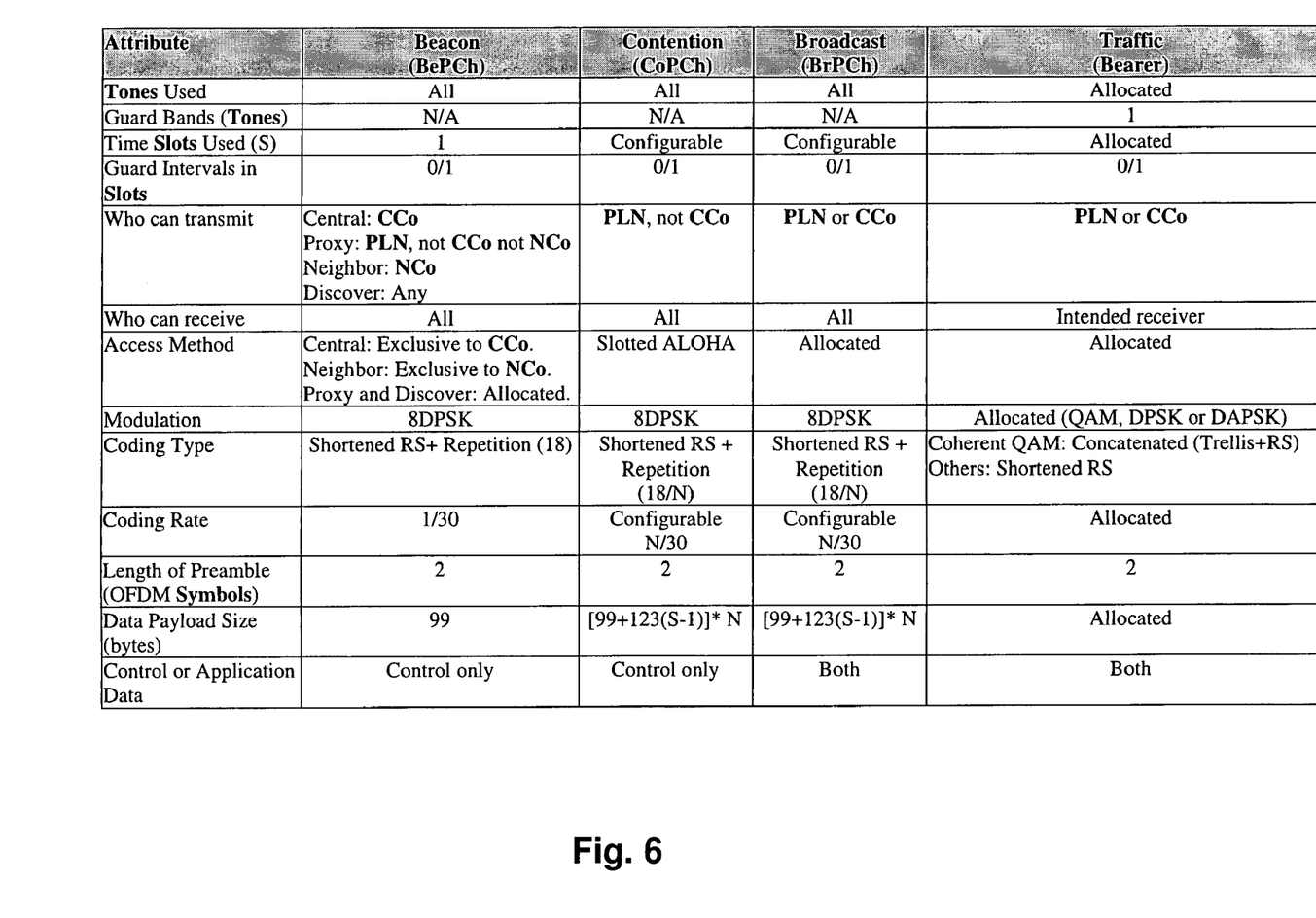
FIG. 6 provides a summary of the attributes of the physical channels.

A summary of the attributes of the channels is shown in FIG. 6. As illustrated, Guard Interval is the time in Slots prior to transmission commencing. Guard Interval is equal to 0 (zero) if the transmitter in previous Slots is the same. The parameter N takes on the values 1, 2, or 3. The parameter S is the number of slots which could be 1, 2, 4, or 8. Guard Band is the number of Tones which are reserved by the CCo between Tone Sets if the Tone Sets are associated with overlapping Slot Sets.

The BePCh, BrPCh and CoPCh may be referred to as Broadcast Channels (or broadcast opportunities) while Bearers are point-to-point Traffic Physical Channels. The three Broadcast Channels types are differentiated by the NetType nibble (lower 4 bits) in the first byte of the Broadcast Channel transmission format. The NetType values are indicated in the following Table.

Table of NetType Values for BePCh, CoPCh, and BrPCh

| NetType value | Physical Channel contents |
|---|---|
| 0 | CoPCh |
| 1 | BrPCh |
| 2 | Discover Beacon on a BePCh |
| 3 | Proxy Beacon on a BePCh |
| 4 | Central Coordinator Beacon on a BePCh |
| 5 | Neighbor Coordinator Beacon on a BePCh |
| 6-15 | Reserved |

The transmissions on BePCh, BrPCh and the CoPCh may be scrambled with the 32-bit cover sequence illustrated in the Table below. In this illustration Network ID is defined as the 48 bit MAC address of the CCo. The least significant 32 bits of the MAC address may be used as the cover sequence. For Neighbor Networks, the Network ID is the 48 bit MAC address of the Neighbor Coordinator (NCo). Proxy Networks and Hidden PLNs (HPLNs) have the same Network ID as the network to which they belong. The Network ID may be carried in the Discover and the Proxy Beacons. They are not required to be carried explicitly in the Neighbor and Central Beacon as the source MAC address for these Beacons is the same as the Network ID.

Sample Scrambler Seed Table for BePCh, BrPCh and CoPCh

| NetType | PHY Channel Content | Scramble Seed |
|---|---|---|
| 0x00 | CoPCh | NetworkID[0:31] |
| 0x01 | BrPCh | NetworkID[0:31] |
| 0x02 | Discover Beacon | 0xFFFF FFFF |
| 0x03 | Proxy Beacon | 0xFFFF FFFF |
| 0x04 | Central Beacon | 0xFFFF FFFF |
| 0x05 | Neighbor Beacon | 0xFFFF FFFF |

Beacon Physical Channel (BePCh)

In one or more embodiments, the BePCh is one Slot long and occupies all Tones. The Beacon transmitted on the BePCh begins with a two symbol over all frequencies, for example. The remaining data may be formed into a block of bytes (e.g., 25 bytes) with 8PSK modulation. A two-byte CRC may be applied to the data in the codeword. Each block may be encoded using a combination of Reed-Solomon (RS) code and repetition coding. The resultant may be repeated as many times (e.g., four) as needed to fill out all the frequencies and symbol times in the beacon. Finally, the results may be coded using a rate ½ trellis code (convolution encoder) with each codeword spanning one symbol length.

In the receiver, the beacon data can be decoded using a combination of methods. For example, each repetition may be decoded independently, symbols may be combined or selected before demodulating, and other techniques may be possible.

In one embodiment, there are four types of Beacon Channels defined: the Central Beacon, the neighbor Beacon, the Proxy Beacon, and the Discover Beacon. All four Beacons have the same message format except that the Network ID is carried only by the Discover and Proxy Beacons.

The Central Beacon is transmitted in the first Slot of every Frame by the CCo controlling the Central Network. The Central Beacon may not carry the Network ID as the source MAC address of the Beacon is the same as the Network ID. It contains the allocations to BePChs, BrPChs and CoPChs for the Central Network.

The Neighbor Beacon may be transmitted once every sub-Frame by the Neighbor Coordinator (NCo) controlling the Neighbor Network. The Neighbor Beacon may not carry the Network ID as the NCo MAC address is the same as the Network ID.

The Proxy Beacon may be transmitted by the Proxy Coordinator (PCo) in a BePCh scheduled for the PCo by the CCo. The Proxy Beacon may be constructed by the PCo from the Central Beacon received from the CCo or NCo with which the PCo is associated. The Proxy Beacon duplicates the Allocations to BePChs, BrPChs and CoPChs as advertised in the Central Beacon received in the Frame in which the Proxy Beacon is transmitted. The Proxy Beacon may contain different MEntries from the Central Beacon. The Proxy Beacon carries the Network ID, which is the 48 bit MAC address of the CCo (or NCo).

The Discover Beacon may be transmitted by every PLN as a part of the Discovery process, in a BePCh scheduled for the particular PLN by the CCo. The Discover Beacon carries the Network ID and the allocations to BePChs, BrPChs and CoPChs advertised in the most recent Central Beacon received by the PLN. The Discover Beacon may or may not carry MEntries.

Note that PLNs in a Neighbor Network treat the NCo as the CCo and the Neighbor Beacon as the Central Beacon.

The table below shows an example format of a Beacon Physical Channel (BePCh). In one or more embodiments, all Beacons carry information about the organization of the current Frame, the Sub-Frame allocation of this Coordinator (i.e., the portion of the Frame being used by this particular network), the MAC address of the source PLN transmitting the Beacon, the partial acknowledgments for the previous (and current) Frames, and the schedule of broadcast opportunities in this Frame. The Beacons may also optionally carry MAC (e.g. UMAC) messages containing control information (i.e. MEntries) from the Coordinator to the other PLNs.

Sample Beacon Physical Channel Format

| Sample Beacon Physical Channel Format BePCh | | | |
|---|---|---|---|
| Reserved (2b) | AckFrms (2b) | NetType (4b) | |
| Frame #[0-7] (8b) | | | |
| Reserved (1b) | # of Broadcasts (4b) | Frame #[8-10] (3b) | |
| Naloha (4b) | | Kaloha (4b) | |
| SubFrmStartTS (8b) | | | |
| SubFrmStopTS (8b) | | | |
| Source MAC Address [0-7] (8b) | | | |
| Source MAC Address [8-15] (8b) | | | |
| Source MAC Address [16-23] (8b) | | | |
| Source MAC Address [24-31] (8b) | | | |
| Source MAC Address [32-39] (8b) | | | |
| Source MAC Address [40-47] (8b) | | | |
| Source TEI (8) | | | |
| Network ID (optional) [0-7] (8b) | | | |
| Network ID (optional) [8-15] (8b) | | | |
| Network ID (optional) [16-23] (8b) | | | |
| Network ID (optional) [24-31] (8b) | | | |
| Network ID (optional) [32-39] (8b) | | | |
| Network ID (optional) [40-47] (8b) | | | |
| Partial ACK Bits$_0$ [0-7] (8b) | | | |
| Partial ACK Bits$_0$ [8-15] (8b) | | | |
| ... | | | |
| Partial ACK Bits$_n$ [0-7] (8b) | | | |
| Partial ACK Bits$_n$ [8-15] (8b) | | | |
| BCAST Dur$_0$ (1b) | SType$_0$ (2b) | BCAST Coding$_0$ (3b) | BCAST Length$_0$ (2b) |
| BCastStartTS$_0$ (8b) | | | |
| BCastTxTEI$_0$ (8b) | | | |
| BCAST Dur$_1$ (1b) | SType$_1$ (2b) | BCAST Coding$_1$ (3b) | BCAST Length$_1$ (2b) |
| BCastStartTS$_1$ (8b) | | | |
| BCasttTxTEI$_1$ (8b) | | | |
| ... | | | |
| BCAST Dur$_n$ (1b) | SType$_n$ (2b) | BCAST Coding$_n$ (3b) | BCAST Length$_n$ (2b) |
| BCastStartTS$_n$ (8b) | | | |
| BCasttTxTEI$_n$ (8b) | | | |
| UMAC Message$_0$ (Control only) | | | |
| UMAC Message$_1$ (Control only) | | | |
| ... | | | |
| UMAC Message$_n$ (Control only) | | | |

NetType: This field identifies the type of this Physical Channel transmission. The value is set to 4 to indicate that this is a Central Beacon transmitted by the CCo. The value is set to 2 for a Discover Beacon, 3 for Proxy Beacon and 5 for a Neighbor Beacon transmitted by a Neighbor Network. (See "Table of NetType Values for BePCh, CoPCh, and BrPCh" above.)

Number of Broadcasts: This field indicates the number of BePCh, BrPCh and CoPCh transmissions that are scheduled in the current Sub-Frame. For each of these scheduled broadcast opportunities, a set of scheduling parameters are included within this transmission to specify the parameters of the broadcast opportunity and the Temporary Equipment Identifier (TEI) of the PLN to which the broadcast opportunity is assigned.

Frame Number: This field indicates the Frame number for this Frame (the Central Beacon transmitted by the CCo is in Slot 0 of this Frame). Eleven (11) bits are used to indicate the Frame #, one byte plus the least significant 3 bits in the following byte. The Frame # value comprises the top 11 bits used in the Timing and Synchronization Function (TSF) at the beginning of the first Symbol time of Slot 0 of this Frame.

AckFrms: The number of Frames for which there are Partial ACK bits in this Beacon. If this transmission is a Central Beacon or a Neighbor Beacon, the first set of Partial ACK bits are for the previous frame. If this transmission is a Proxy Beacon or a Discover Beacon, the first set of Partial ACK Bits are for the current frame. If the value of this field is called P, then the number of Frames with Partial ACK bits is defined as $2^P$ (i.e., P=0=>1 Frame, P=1=>2 Frames, P=2=>4 Frames, P=3=>8 Frames).

Source MAC Address: The MAC address of the PLN transmitting this Beacon (could be the CCo, PCo, NCo, or PLNs transmitting Discover Beacons). This value is used by other PLNs during the associate process to discriminate among networks. For Central and Neighbor Beacons, the least significant four (4) bytes of this value are used as the scrambling seed for BrPCh and CoPCh transmissions.

Source TEI: The TEI of the PLN transmitting this Beacon (could be the CCo, PCo, NCo, or PLNs transmitting Discover Beacons).

Network ID: This is a six (6) byte field. The least significant 4 bytes are used as the scrambling seed for BrPCh and CoPCh transmissions. Network ID is the same as Coordinator's MAC address. This field is omitted in the Central and Neighbor Beacons (since the Source MAC Address is the same as Network ID); it is included in Proxy and Discover Beacons.

Naloha: This parameter is used to compute the probability of initial transmission over the CoPChs in this Frame. This parameter is used by the Slotted ALOHA protocol defined for CoPCh access.

Kaloha: This field is used to compute the probability of re-transmission of messages to be sent over the CoPChs in this Frame. This parameter is used by the Slotted ALOHA protocol defined for CoPCh access.

Partial ACK Bits$_n$: Each bit in this field indicates if the BePCh, BrPCh or CoPCh transmissions in the previous $n^{th}$ Frame were correctly received by this PLN. The bits are a partial acknowledgement of the BePCh, BrPCh and CoPCh transmissions. A value of 1 (one) indicates that the PLN correctly received the transmission. A value of 0 (zero) indicates that the transmission was not correctly received, no transmitter was active or the transmission opportunity was assigned to this PLN.

SubFrmStartTS: The starting Slot number of the Sub-Frame delineated by this Beacon. The Slot number is specified relative to the Central Beacon. The first Slot of the Frame, i.e., the Central Beacon, is Slot #0 and the last Slot of the Frame is Slot #255.

SubFrmStopTS: The ending Slot number of the Sub-Frame delineated by this Beacon. The Slot number is specified relative to the Central Beacon. The first Slot of the Frame, i.e., the Central Beacon, is Slot #0 and the last Slot of the Frame is Slot #255.

BCAST Length$_n$: These fields specify the number of Slots allocated to the $n^{th}$ broadcast opportunity scheduled by this Coordinator. If the value of this field is called P, then the length of the broadcast opportunity is defined as $2^P$ (i.e., P=0: 1 Slot, P=1: 2 Slots, P=2: 4 Slots, P=3: 8 Slots).

BCAST Coding$_n$: These fields define the encoding of the $n^{th}$ broadcast opportunity scheduled by this Coordinator. The values are:

0: NULL Broadcast. No modulation in this broadcast opportunity. Used in the sounding process to measure background noise on the Tones 1: Standard Broadcast Encoding with N=1. For BePCh, N must equal to 1. The available bytes in the BePCh, BrPCh or CoPCh can be calculated with the equation:

ByteLength=(99+(123*(length of broadcast Slots-1))
*N.

2: Standard Broadcast Encoding with N=2.
3: Standard Broadcast Encoding with N=3.
4 to 7: Reserved for future broadcast encodings.

SType$_n$: These fields define the type of the scheduled broadcast opportunity. The field is valid only if the corresponding BCAST Coding field is not equal to 0 (zero). The values are:

0: Contention Physical Channel (CoPCh)
1: Scheduled Broadcast Physical Channel (BrPCh)
2: Discover Beacon (BePCh)
3: Proxy Beacon (BePCh)

BCAST Dur$_n$: These fields define the length of time in Frames for which the allocation made to a broadcast channel remains valid. The values are:

0: at least 1 Frame time
1: at least enough Frame times to be more than 1 discovery period BCastStartTS$_n$: These fields specify the starting Slot number in this Frame of the $n^{th}$ broadcast opportunity. The Slot number is specified relative to the Central Beacon. The first Slot of the frame, i.e., the Central Beacon, is Slot #0 and the last Slot of the Frame is Slot #255.

BCastTxTEI$_n$: These fields specify the TEI of the PLN to which the $n^{th}$ broadcast opportunity is assigned.

UMAC Message$_s$: The remainder of the BePCh transmission is filled with UMAC Messages that each contain an MEntry message from the Coordinator. After the UMAC Messages, a NULL MEntry is used to fill up the remaining space of the BePCh transmission. If the remaining space is not big enough for a NULL MEntry, it is padded with 0's.

Broadcast Physical Channels (BrPChs)

BrPChs are broadcast opportunities scheduled by the CCo (or NCo) for BCAST transmissions from individual PLNs or from the Coordinator itself. BrPChs may carry application data from Broadcast (BCAST) Connections or control information in the form of MEntries from control channels. Both MEntries (control messages) and application data (Transport Layer Messages) are encapsulated in UMAC Messages. PLNs that are scheduled broadcast opportunities must transmit in the assigned BrPCh even if they have no MEntries to transmit. The BrPCh transmission must contain the Partial ACK fields from the PLN.

The table below shows the structure of the BrPCh. Each broadcast opportunity is scheduled by the Coordinator and the resulting schedule is sent in the BePCh of each Frame (or sub-Frame for a Neighbor Network). The BrPCh contains both control and user data information in UMAC packets.

Broadcast Physical Channel Format

| Broadcast Physical Channel Format BrPCh | | |
| --- | --- | --- |
| Reserved (2b) | AckFrms (2b) | NetType = 1 (4b) |
| Source TEI (8b) | | |
| Partial ACK Bits$_0$ [0-7] (8b) | | |
| Partial ACK Bits$_0$ [8-15] (8b) | | |
| ... | | |
| Partial ACK Bits$_n$ [0-7] (8b) | | |
| Partial ACK Bits$_n$ [8-15] (8b) | | |
| UMAC Message$_0$ | | |
| UMAC Message$_1$ | | |
| ... | | |
| UMAC Message$_n$ | | |

NetType: This field identifies the type of this Physical Channel transmission. The value is set to 1 to indicate that this is a BrPCh.

AckFrms: The number of Frames for which there are Partial Ack Bits in this Broadcast. If the value of this field is 'P', then the number of Frames with Partial Ack Bits is defined as $2^P$ (i.e., P=0: 1 Frame, P=1: 2 Frames, P=2: 4 Frames, P=3: 8 Frames).

Source TEI: The TEI of the transmitting PLN. In the case of the BrPCh, this information is probably redundant because each receiving PLN will know the transmitting PLN's TEI by observing the assigned TEI as sent in the Beacon. However, in the case of the CoPCh, the Source TEI is required since multiple PLNs compete for the same transmit opportunity.

Partial ACK Bits$_n$: Each bit in this field indicates if the BePCh, BrPCh or CoPCh transmissions in the previous $n^{th}$ Frame were correctly received by this PLN (n=0 means the partial ACK bits are for the current Frame). The bits are a partial acknowledgement of the BePCh, BrPCh and CoPCh transmissions. A value of 1 (one) indicates that this PLN correctly received the transmission. A value of 0 (zero) indicates that the transmission was not correctly received or the transmission opportunity was assigned to this PLN.

UMAC Message$_n$: The remainder of the transmission is filled with UMAC Messages. A UMAC Message may contain an MEntry message or it may contain user traffic. UMAC Messages broadcast in this physical channel are small enough to be wholly transmitted in a single broadcast opportunity (preferably without segmentation) and should be part of a communication stream that has low bandwidth requirements. After the UMAC Messages, a NULL MEntry may be used to fill up the remaining space of the transmission. If the remaining space is not big enough for a NULL MEntry, it is padded with 0's.

Contention Physical Channel (CoPCh)

A CoPCh is a Broadcast Channel on which PLNs contend for access. The CCo schedules CoPChs via the Central Beacon. Messages sent in a CoPCh are intended for the CCo. HPLNS may use the CoPCh to communicate with another PLN which relays the communication to the CCo. Such a relay PLN is called a Proxy PLN. The CoPCh is used to send control information in the form of MEntries. The CoPCh carries the PLN to Coordinator Logical Control Channel (DCLCh) information. Application data belonging to Broadcast Connections are not transmitted on a CoPCh.

Multiple access is provided for CoPCh through a form of Slotted ALOHA. When a CoPCh becomes available, any PLN that wants to send a message over that channel will transmit with a probability 1/(2^Naloha), where Naloha varies from 0 to 15. Naloha is determined by the CCo and communicated with the PLNs over the Beacon.

If a PLN sends a message over the CoPCh but the message is not received, the PLN backs off for k CoPCh opportunities and tries again. k is a uniformly distributed random variable between 0 and (2^Kaloha)−1. Kaloha is determined by the CCo and communicated over the Central Beacon. Kaloha varies from 0 to 15.

A PLN that has transmitted in a CoPCh listens to the subsequent broadcast channel transmissions (BePCh, BrPCh or CoPCh transmissions) for the Partial ACK bits. The Partial ACK procedure informs the PLN if its CoPCh transmission was correctly received by at least one other PLN or Coordinator in the network.

The table below shows the structure of the CoPCh. Each CoPCh opportunity is scheduled by the Coordinator and the resulting schedule is sent in the BePCh of each Sub-Frame.

Sample Contention Physical Channel Format

| Sample Contention Physical Channel Format CoPCh | | |
| --- | --- | --- |
| Reserved (2b) | AckFrms (2b) | NetType = 0 (4b) |
| Source TEI (8b) | | |
| Partial ACK Bits$_0$ [0-7] (8b) | | |
| Partial ACK Bits$_0$ [8-15] (8b) | | |
| ... | | |
| Partial ACK Bits$_n$ [0-7] (8b) | | |
| Partial ACK Bits$_n$ [8-15] (8b) | | |
| UMAC Message $_0$ (Control only) | | |
| UMAC Message $_1$ (Control only) | | |
| ... | | |
| UMAC Message $_n$ (Control only) | | |

NetType: This field identifies the type of this physical channel transmission. The value is set to 0 (zero) to indicate that this is a Contention Physical Channel.

AckFrms: The number of Frames for which there are Partial ACK bits in this Beacon. If the value of this field is P, then the number of Frames with Partial ACK bits is defined as $2^P$ (i.e., P=0: 1 Frame, P=1: 2 Frames, P=2: 4 Frames, P=3: 8 Frames).

Source TEI: The TEI of the transmitting PLN.

Partial ACK Bits$_n$: Each bit in this field indicates if the BePCh, BrPCh or CoPCh transmissions in the previous $n^{th}$ Frame were correctly received by this PLN (n=0 means the Partial ACK bits are for the current Frame). The bits are a partial acknowledgement of the BePCh, BrPCh and CoPCh transmissions. A value of 1 (one) indicates that this PLN correctly received the transmission. A value of 0 (zero) indicates that the transmission was not correctly received or the transmission opportunity was assigned to this PLN.

UMAC Message$_n$: The remainder of the CoPCh transmission is filled with UMAC Messages that each contains a single MEntry message. UMAC Messages broadcast in this physical channel are small enough to be wholly transmitted in a single broadcast opportunity (preferably without segmentation). Only MEntries are allowed; User Messages may not be transmitted. After the UMAC Messages, a NULL MEntry is used to fill up the remaining space of the CoPCh transmission. If the remaining space is not big enough for a NULL MEntry, it is padded with 0's.

Traffic Physical Channel (Bearers)

Bearers are point to point bi-directional physical links between two PLNs or between a PLN and a Coordinator. Bearers are specified by the following parameters: Allocations in frequency (Tones) and time (Slots)—that may be used to send application data or control information, modulation information, and if needed the location of Pilot Tones and Pilot Symbols. (A Pilot Symbol is a single symbol of information which is used for PHY Layer synchronization). The modulation information includes number of bits per Symbol, and modulation type.

Each Bearer has a two-byte identifier called the Bearer ID or BID. The valid range for BID is from 0x0000 to 0xFFFF. Furthermore, the values 0x0000 and 0xFFFF are reserved to represent BrPChs that are used for sending broadcast control and user messages, respectively.

Each Bearer has an LMAC function associated with it that performs coding, interleaving and ARQ. Bearers may carry Traffic Logical Channels (Connections) or Control Logical Channels (DDLChs or DCLChs).

Bearers are established by the CCo in response to specific requests from the Bearer Manager (BM) in a PLN for a Bandwidth (BW) grant, a Connection establishment or a Control Channel establishment. Bearers are classified as Negotiable Bearers and Non-Negotiable Bearers.

Negotiable Bearers are typically established to support Connections which can tolerate a longer set up delay and carry continuous or streaming application data requiring relatively higher BW and QoS.

Thus, Negotiable Bearers are Bearers where the CCo only makes a coarse Slot/Tone allocation to the two PLNs based on the sounding process. (Sounding is a background process by which the CCo collects and maintains up-to-date information on the quality of the power line channels between individual PLNs.) The two PLNs then communicate with each other and perform Channel Analysis before deciding between themselves the actual Tones and Slots used, location of the pilot Tones and pilot Symbols (if needed), and the modulation density and modulation type to be used on each Tone. ARQ is performed by the LMAC function associated with this Bearer.

Non-negotiable Bearers are Bearers where the CCo specifies all the parameters that define the Bearer: Tone and Slot assignment and modulation density. A known modulation type, e.g., DPSK, is always used for non-negotiable Bearers. There is no Channel Analysis procedure for establishment of non-negotiable bearers. Both PLNs use the CCo specified parameters to exchange application data or control information. The LMAC function associated with the non-negotiable Bearer performs ARQ.

Non-negotiable Bearers are typically established to support Connections which cannot tolerate a longer set up delay. These Connections typically carry short bursts of data such as in IP applications.

Logical Control Channels

Logical Channels are classified into traffic and control logical channels as shown in FIG. 5. There are three classes of control channels based on the source and destination of the control information flow: the Beacon Logical Channel (BeLCh), the PLN to Coordinator Logical Channel (DCLCh) and the PLN to PLN Logical Channel (DDLCh).

All control messages are formatted as MEntries. The MEntry format is shown in the table below. The MEntry messages may be sent over any of the physical channels (BePCh, BrPCh, CoPCh and Bearer). A single MEntry message is encapsulated in a UMAC Control Message before it is transferred to the LMAC.

Sample Format of MEntry

| Sample Format of MEntry |
| --- |
| MEntry |
| MType (8b) |
| Destination TEI (8b) |
| Message Contents |
| (variable length) |

MType: This field defines the contents of the message.

Destination TEI: The TEI of the intended receiver. If this field has the value 0xFF, then the MEntry message is intended for all PLNs. If this field has a value of 0x00, then the PLN does not yet have a TEI assigned.

Message Contents: The contents of the message. The format of this section is determined by the MType field.

Figure 7:
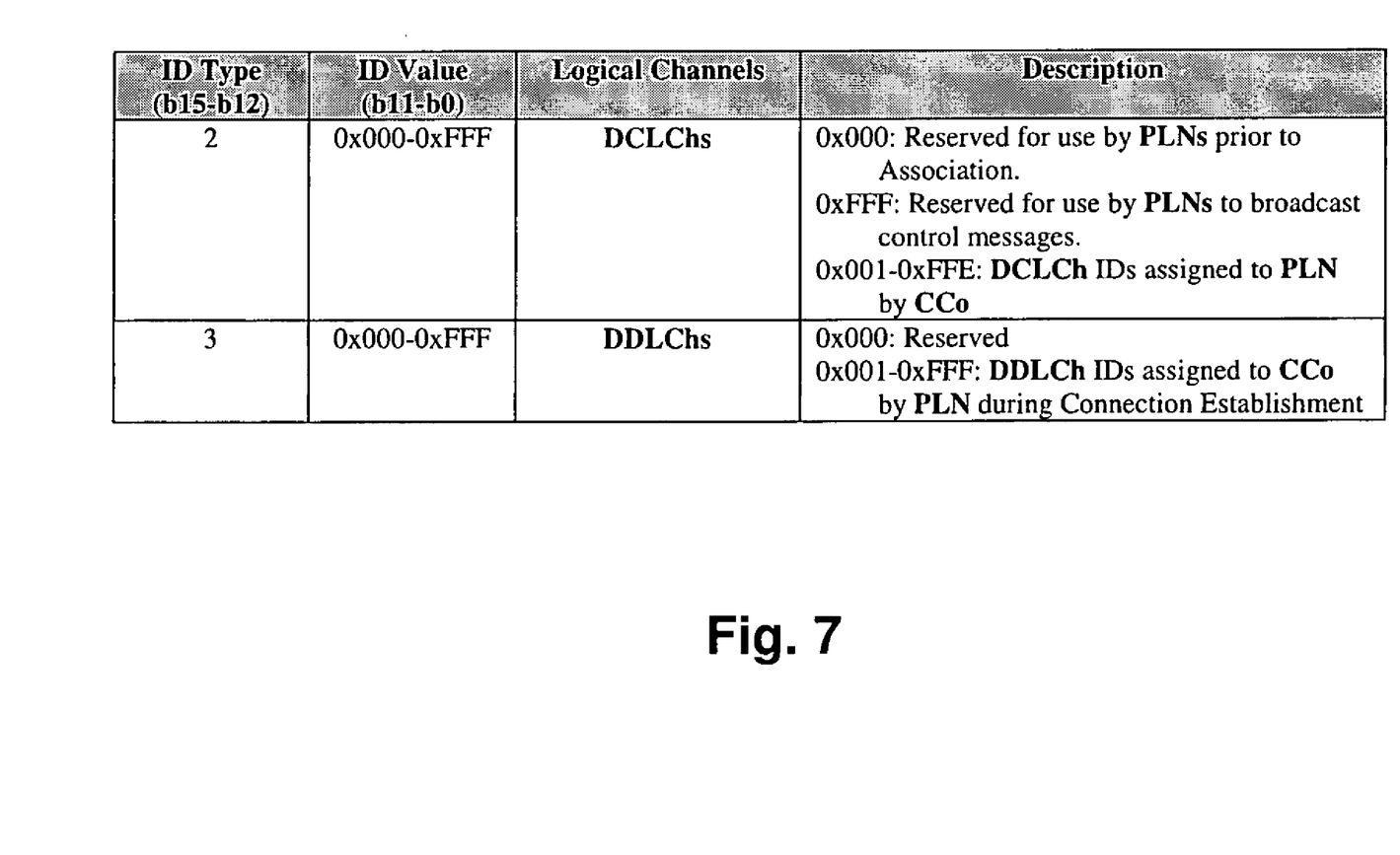
FIG. 7 is an illustration of control channel identifier values that are assigned to the two classes of control channels from PLNs.

Logical Control Channels are identified by a two byte Identifier header in the UMAC messages. Sample control channel identifier values that are assigned to the two classes of control channels from PLNs are shown in FIG. 7.

The set of parameters that define the traffic characteristics and QoS requirements of the Control Channel are known as the Control Channel Management Specification (MSPEC). The Management Specification contains a 1 (one) byte Length field, a 2 (two) byte MID field, a 1 (one) byte MINFO field and a number of MSPEC fields. The Length field specifies the size of the MSPEC in bytes, including the Length field itself. The MID field is a unique identifier for the Control Channel. The MINFO field specifies functions required from the protocol layers handling control channels. MSPEC fields provide QoS parameters such as the maximum delay. The assignment of the 1 byte MINFO field and the MSPEC fields are shown in the following Tables below.

Sample MINFO Assignment

| Sample MINFO Assignment | | |
| --- | --- | --- |
| Bit in MINFO | Function | Description |
| 0 | In-Sequence Delivery Indicator (IDI) | 0: MEntries need not be delivered in order of their Seq. Numbers to protocol entities by the UMAC in the receiver. 1: MEntries must be delivered in order of their SEQN to protocol entities by the UMAC in the receiver |
| 1-2 | Scheduler | 0 = CGS (Continuous Grant Service) scheduler requested for BW Allocations 1 = PGS (Periodic Grant Service) scheduler 2 = PAGS (Priority Aperiodic Grant Service) scheduler |
| 3-7 | Reserved | |

Sample MSPEC Fields

| Sample MSPEC Fields | | | |
| --- | --- | --- | --- |
| MSPEC Field | FID | Length | Field Definition |
| Max Delay | 0b00001 | 4 bytes | Maximum delay in microseconds that can be tolerated in delivering MEntries. |

MSPEC Fields may be coded using the format shown in the table below. It consists of a 1-Byte Field Identifier (FID), followed by 1 to 4 bytes of field data.

Encoding of MSPEC Fields

| Encoding of MSPEC Fields | | | | |
| --- | --- | --- | --- | --- |
| b7 | b6 | b2 | b1 | b0 |
| F/R (1b) 1 - Fwd. 0 - Rev. | FID (5b) | | Field Length (2b) | |

-continued

Encoding of MSPEC Fields

| b7 | b6 | b2 | b1 | b0 |
|----|----|----|----|----|
| Field Data Octet 1 | | | | |
| Field Data Octet 2 | | | | |
| ... | | | | |
| Field Data Octet N | | | | |

The Forward/Reverse (FIR) bit is set to 1 (Forward) for Control Channels. The MINFO and MSPEC parameters are system parameters that will be specified by the CCo.

Beacon Logical Channel (BeLCh)

The BeLCh is used by the Coordinators to transmit control information which has network wide relevance such as Network ID, location and size and encoding of BrPCh and CoPCh opportunities, etc. The BePCh carries the BeLCh. The BePCh may also carry DCLCh information.

PLN (Device) to Coordinator Logical Channel (DCLCh)

The DCLCh is a bi-directional control channel between a PLN and the Coordinator. The DCLCh may use a Bearer or a Broadcast Physical Channel (BePCh, BrPCh, or CoPCh). The UMAC may route MEntries from a DCLCh on any available PHY channel. If a traffic Bearer is required to support the DCLCh, the BM makes a request to the CCo for the establishment of a Bearer.

PLN to PLN (Device to Device) Control Channel (DDLCh)

The DDLCh is a control channel connecting two PLNs. It is multiplexed "in band" with traffic data by the UMAC; i.e., the DDLCh uses the same Bearer as the application data between the two PLNs. It is only available when a Bearer exists between the two PLNs. The DDLCh is bi-directional and since it uses a Bearer, it provides reliable transport of control messages between the two PLNs.

Traffic Logical Channels (Connections)

Traffic Logical Channels are called Connections. A Connection is a bi-directional logical association between the Transport Systems/layers of two or more PLNs, exclusively carrying application data. A PLN can support multiple Connections simultaneously with another PLN or group of PLNs. Connections may be unicast (point to point), multicast (point to multipoint) or broadcast. Unicast and Multicast Connections use Bearers. BCAST Connections use BrPChs which are scheduled by the CCo. A Connection exists only between two communicating PLNs and may not be used for communication of control information with the CCo. Connections are uniquely identified by a global identifier called the CID which is assigned by the CCo at the time of Connection Set-up.

What is claimed is:

1. A method for scheduling access to a medium for network devices of a multi-point to multi-point network, the method comprising:
   dividing a frame of time-frequency space into time slot allocations and time frequency allocations of physical channels, wherein said time slot allocations are for a single time slot across all frequencies and said time-frequency allocations are allocated for more than one time slot across more than one frequency and wherein said time frequency allocations are allocated to traffic channels and said time slot allocations are allocated to any combination of broadcast, beacon and ALOHA contention-based channels, wherein said broadcast, beacon and contention-based channels are receivable by all said devices; and
   assigning said allocations to said devices according to the type of data each said device has to transmit.

2. The method according to claim 1 and wherein said beacon channel indicates a beginning of a frame.

3. The method according to claim 1 and wherein said medium is a powerline.

4. The method according to claim 1 and wherein said assigning comprises:
   assigning a traffic logical channel to one of a traffic channel and a broadcast channel;
   assigning a device to device control channel to a traffic channel;
   assigning a device to coordinator control channel to all types of physical channels; and
   assigning a beacon logical channel to said beacon channel.

5. The method according to claim 1 and wherein said assigning comprises assigning reserved slots at least for sounding measurements.

6. A method for scheduling access to a medium for network devices of a multi-point to multi-point network over a powerline, the method comprising:
   a scheduler of a central network determining that a neighbor network utilizing said powerline has been added;
   said scheduler dividing a frame of time-frequency space into sub-frames for a central network and for neighboring networks of said central network; and
   said scheduler allocating said sub-frame for said central network; and
   said scheduler enabling a scheduler of each said neighbor network to allocate its said sub-frame,
   wherein said allocating said sub-frame comprises dividing a frame of time-frequency space into time slot allocations and time frequency allocations of physical channels, wherein said time slot allocations define allocations over time across all frequencies and said time-frequency allocations define allocations across time and frequency and wherein said time frequency allocations are allocated to traffic channels and said time slot allocations are allocated to any combination of broadcast, beacon and contention-based channels, wherein said broadcast, beacon and contention-based channels are receivable by all said devices.

7. The method according to claim 6 and wherein said scheduler allocates a beacon channel to indicate a beginning of a frame or a sub-frame.

8. The method according to claim 6 and wherein said allocating said sub-frame comprises:
   assigning logical channels of each network device to said physical channels, according to the type of data in each logical channel and the type of traffic each physical channel carries; and
   providing said ALOHA contention-based channel for unscheduled transmissions.

9. A network device for a multi-point to multi-point network: the device comprising:
   a scheduler to divide a frame of time-frequency space into time slot allocations and time frequency allocations of physical channels, wherein said time slot allocations are for a single time slot across all frequencies and said time-frequency allocations are allocated for more than one time slot across more than one frequency and wherein said time frequency allocations are allocated to traffic channels and said time slot allocations, are allocated to any combination of broadcast, beacon and ALOHA contention-based channel, wherein said broadcast, beacon and contention-based channels are receivable by all said devices; and a channel assigner to assign said allocations to said devices according to the type of data each said device has to transmit.

10. The device according to claim 9 and wherein said beacon channel indicates a beginning of a frame.

11. The device according to claim 9 and wherein said medium is a powerline.

12. The network device according to claim 9 and wherein said channel assigner comprises:

a mapper to assign a traffic logical channel to one of a traffic channel and a broadcast channel, to assign a device to device control channel to a traffic channel, to assign a device to coordinator control channel to all types of physical channels and to assign a beacon logical channel to said beacon channel.

13. The network device according to claim 9 and wherein said channel assigner comprises a slot assigner to assign reserved slots at least for sounding measurements.

14. A network device for a multi-point to multi-point network over a powerline, the device comprising:

a scheduler of a central network determining that a neighbor network utilizing said powerline has been added, to divide a frame of time-frequency space into sub-frames for said central network and for neighboring networks of said central network and to allocate a sub-frame for said central network and the remaining said sub-frames for said neighboring networks; and a channel assigner to assign said allocations to said devices of said central network according to the type of data each said device has to transmit, wherein said scheduler comprises a frame divider to divide a frame of time-frequency space into time slot allocations and time frequency allocations of physical channels, wherein said time slot allocations define allocations over time across all frequencies and said time-frequency allocations define allocations across time and frequency and wherein said time frequency allocations are allocated to traffic channels and said time slot allocations are allocated to any combination of broadcast, beacon and contention-based channels, wherein said broadcast, beacon and contention-based channels are receivable by all said devices.

15. The device according to claim 14 and wherein said beacon channel indicates a beginning of a frame or a sub-frame.

16. The network device according to claim 14 and wherein said channel assigner comprises:

a mapper to assign logical channels of each network device to said physical channels, according to the type of data in each logical channel and the type of traffic each physical channel carries and to provide said contention-based channel for unscheduled transmissions.

\* \* \* \* \*